(12) United States Patent
Koehler et al.

(10) Patent No.: US 9,611,838 B2
(45) Date of Patent: Apr. 4, 2017

(54) FRACTURING SHAPE MEMORY MECHANICAL ACTUATORS AND SYSTEMS

(71) Applicant: Raytheon Company, Waltham, MA (US)

(72) Inventors: Frederick B. Koehler, Waltham, MA (US); Ward D. Lyman, Waltham, MA (US); Michael J. Birch, Waltham, MA (US)

(73) Assignee: Raytheon Company, Waltham, MA (US)

( * ) Notice: Subject to any disclaimer, the term of this patent is extended or adjusted under 35 U.S.C. 154(b) by 283 days.

(21) Appl. No.: 14/248,146

(22) Filed: Apr. 8, 2014

(65) Prior Publication Data

US 2015/0285228 A1    Oct. 8, 2015

(51) Int. Cl.
*F03G 7/06* (2006.01)
*F03G 1/06* (2006.01)

(52) U.S. Cl.
CPC ............. *F03G 7/065* (2013.01); *F03G 1/06* (2013.01); *Y10T 74/11* (2015.01)

(58) Field of Classification Search
CPC ............. F03G 7/00; F03G 7/06; F03G 7/065
USPC .................................................. 60/527–529
See application file for complete search history.

(56) References Cited

U.S. PATENT DOCUMENTS

| | | | | |
|---|---|---|---|---|
| 4,553,393 A | * | 11/1985 | Ruoff | F03G 7/065 337/140 |
| 4,586,335 A | * | 5/1986 | Hosoda | B25J 18/025 294/86.4 |
| 4,840,346 A | * | 6/1989 | Adnyana | E21B 33/062 166/363 |
| 5,245,738 A | | 9/1993 | Johnson | |
| 7,331,616 B2 | * | 2/2008 | Brei | E05B 47/0009 292/100 |
| 8,418,455 B2 | | 4/2013 | Lyman et al. | |
| 2005/0210874 A1 | * | 9/2005 | Browne | F03G 7/065 60/527 |
| 2006/0097113 A1 | * | 5/2006 | Landsberg | B64D 1/02 244/137.4 |
| 2006/0273876 A1 | * | 12/2006 | Pachla | H05K 1/0201 337/140 |

(Continued)

FOREIGN PATENT DOCUMENTS

JP    02171594 A  *  7/1990

OTHER PUBLICATIONS

Systima Technologies, Inc.; Products/Industrial Ordinance and Pyrotechnic Actuators; https://web.archive.org/web/20110127120922/http://www.systima.com/prod/products.html ; Archived online Jan. 11, 2011; 2 pages ; Systima Technologies, Inc.

(Continued)

*Primary Examiner* — Thomas Denion
*Assistant Examiner* — Laert Dounis (57) ABSTRACT

A mechanical actuator is disclosed. The mechanical actuator can comprise an interface portion configured to interface with an object, a spring configured to exert a force on the interface portion, and a shape memory member coupled to the interface portion. The shape memory member can be configured to fracture at a predetermined temperature range. Upon fracture of the shape memory member, the force of the spring can cause the interface portion to act on the object.

19 Claims, 6 Drawing Sheets

(56) References Cited

U.S. PATENT DOCUMENTS

| | | | |
|---|---|---|---|
| 2011/0232278 A1* | 9/2011 | Lyman | F03G 7/065 60/527 |
| 2011/0234362 A1* | 9/2011 | Koehler | F03G 7/065 337/290 |
| 2014/0086772 A1* | 3/2014 | Olsen | F03G 7/065 417/510 |

OTHER PUBLICATIONS

Systima Technologies, Inc.; Technologies: Energetic Systems; https://web.archive.org/web/201111103082016/http://www.systima.com/tech/pyro.html ; Archived onlin Nov. 3, 2011; 1 page; Systima Technologies, Inc.

Tini Aerospace; Frangibolt®; https://web.archive.org/web20120812232516/http://tiniaerospace.com/frangibolt.html ; Archived online Aug. 12, 2012; 2 pages; TiNi Aerospace.

Tini Aerospace; Pinpuller; https://web.archive.org/web/20120813042026/http://www.tiniaerospace.com/pinpuller.html ; Archived.online Aug. 13, 2013; 2 pages; TiNi Aerospace.

Tini Aerospace; Custom Actuators; http://www.tiniaerospace.com/custom.html ; 2013; 1 page; TiNi Aerospace.

\* cited by examiner

FRACTURING SHAPE MEMORY MECHANICAL ACTUATORS AND SYSTEMS

BACKGROUND

A variety of devices or mechanisms may function as actuators or may be used for actuating objects. One generic type of actuator functions to push and/or pull a pin, which can initiate a wide variety of devices, such as a release mechanism. A typical pin pusher/puller may be driven by a solenoid. Depending on the situation, it may be beneficial to have an actuator that is actively initiated or passively initiated. In a particular case, it may be desirable to have a passively initiated actuator that does not require power or a signal, but that can react in response to a given ambient condition, which can initiate the actuator. One such application is a thermally activated ventilation system to prevent an explosion in the event of a fire near a flammable material. A current device uses melting eutectic alloys that can be tuned to a given temperature, or energetic devices tuned to react at a given temperature. Another device, the FRANGI-BOLT® brand actuator (TiNi Aerospace, Inc.), uses a shape memory alloy collar to break a hardened steel bolt, thereby releasing spring energy to push a pin.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although currently available actuators have been successfully used in a variety of different applications, these actuators do have drawbacks. For example, a melting eutectic device is complex, and energetic devices, as well as the FRANGIBOLT®, are not tunable to a broad range of temperatures. In addition, a solenoid requires power and a signal for activation, and energetic devices are likely to require added safety precautions. Moreover, energetic devices typically generate shrapnel (foreign object debris or FOD). Explosively propelled FOD can damage sensitive components and thereby interrupt or hamper operation of those components. An energetic device may operate as intended but the FOD generated (as well as the explosive and acoustic shock, heat, and the like) may undesirably necessitate repair or replacement of equipment damaged through operation of the actuator.

Accordingly, a mechanical actuator is disclosed that is simple, safe (no energetics), and easy to tune for activation at a desired temperature or temperature range. In one aspect, the mechanical actuator can be actively or passively actuated. The mechanical actuator can include an interface portion configured to interface with an object, a spring configured to exert a force on the interface portion, and a shape memory member coupled to the interface portion. The shape memory member can be configured to fracture at a predetermined temperature range. Upon fracture of the shape memory member, the force of the spring, and possibly that of snap-back of the shape memory member can cause the interface portion to act on the object.

In one aspect, a mechanical actuator system is disclosed. The system can include an object and a mechanical actuator. The mechanical actuator can have an interface portion configured to interface with the object, a spring configured to exert a force on the interface portion, and a shape memory member coupled to the interface portion. The shape memory member can be configured to fracture at a predetermined temperature range. Upon fracture of the shape memory member, the force of the spring can cause the interface portion to act on the object.

The embodiments described herein provide a variety of mechanical actuators utilizing shape memory alloy members and/or components. An "actuator," as used herein, refers to an apparatus, mechanism, or mechanical device that is configured to activate or put an object, which is configured to be in contact with the actuator, into motion by imparting, directly or indirectly, force or kinetic energy to the object. The actuators or portions of the actuators are formed from a shape memory alloy that exhibits a shape memory effect where, as described in more detail below, the shape memory alloy can be deformed and then returned to its original shape when heated.

Figure 1A:
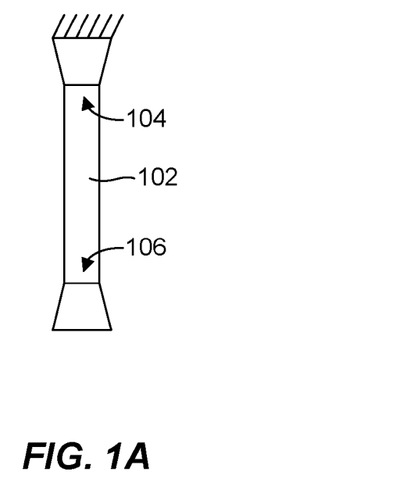
FIGS. 1A-1D illustrate the use of heat to separate a member formed from a shape memory alloy, in accordance with an example of the present disclosure.
Figure 1B:
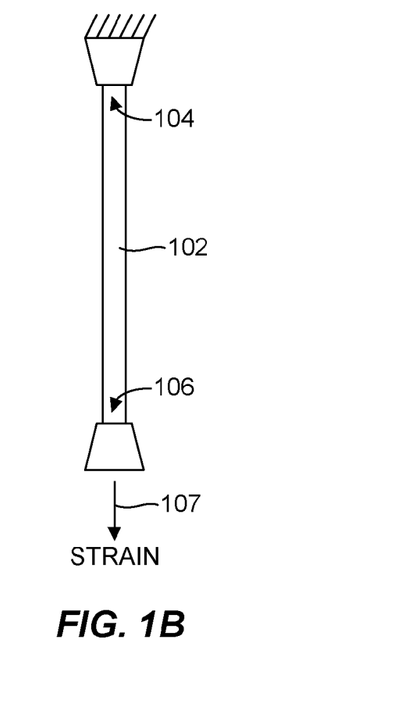
Figure 1C:
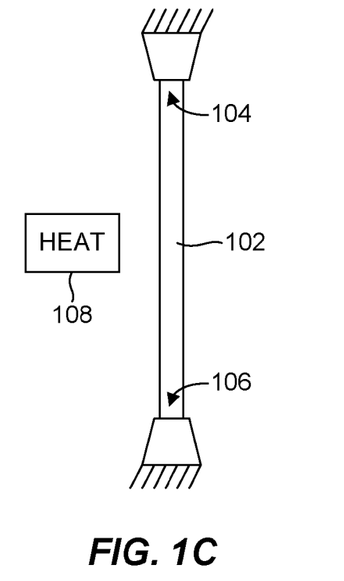
Figure 1D:
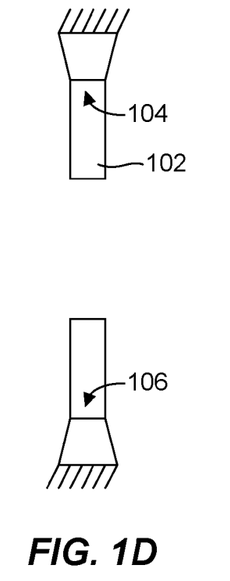

FIGS. 1A-1D illustrate how this shape memory effect may be used in a mechanical actuator. FIG. 1A illustrates a member 102 of a mechanical actuator formed from a shape memory alloy, in accordance with an embodiment of the invention. As used herein, a "member" refers to a constituent part of a mechanical actuator and, in the example of FIG. 1A, the member 102 is in the shape of a bar or tendon having two opposing ends 104 and 106 that, as shown in FIG. 1B, are held in place and pulled in opposite directions such that the member 102 is under strain 107. As illustrated in FIG. 1C, the opposing ends 104 and 106 are fixed in place and a heating source 108 applies heat to the member 102, and upon application of heat, the member 102 attempts to contract and exert a tensile force, which functions to separate or fracture the member 102 into two pieces (FIG. 1D) because of the shape memory effect. As used herein, to "separate" is to come apart caused by a break or fracture in the shape memory allow member. As described in more detail below, such a unique property of shape memory alloys can be used to actuate an object.

Figure 2:
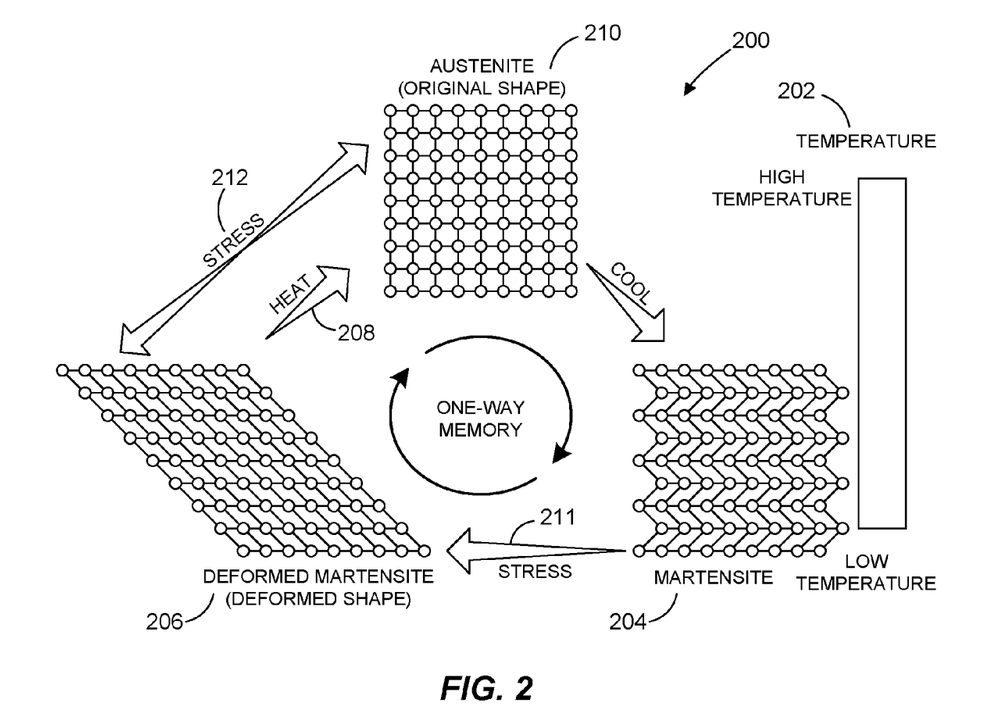
FIG. 2 is a diagram illustrating the various solid phases of an example shape memory alloy at different temperatures and stress states.

FIG. 2 is a representative diagram 200 illustrating the various solid phases of a shape memory alloy at different temperatures and stress states. The diagram 200 includes a temperature reference 202 identifying a temperature increasing from a low temperature at the bottom of the diagram 200 to a high temperature at the top of the diagram 200. Additionally, the diagram 200 illustrates the different solid phases or crystal structures of a shape memory alloy at temperatures identified by the temperature reference 202.

It should be appreciated that shape memory alloys undergo a temperature related phase change that is characterized by the memory of a mechanical configuration imposed on the material at an annealing temperature. When the shape memory alloy is below some lower temperature, the alloy possesses a particular crystal structure whereby it may be deformed into an arbitrary shape with relative ease. Upon heating the alloy above a higher temperature, the alloy undergoes a change in crystal structure and the shape memory effect is manifested by a resumption of the originally imparted shape, representing the onset of a restoring stress.

FIG. 2 shows a pictorial diagram illustrating the shape memory effect of an example material formed from a shape memory alloy. At a low temperature (e.g., at room temperature), the shape memory alloy is in a martensite phase 204 where the shape memory alloy has a body centered tetragonal crystal structure and may be relatively soft and deformable. When stress 211 is applied to the martensite phase 204, the shape memory alloy is deformed and transformed into a deformed martensite phase 206. For example, the shape memory alloy in the martensite phase 204 may be stretched, compressed, and/or sheared such that it takes on a deformed shape that is in a deformed martensite phase 206. In the deformed martensite phase 206, the atoms may move past each other, but the bonds are not broken, and the atoms are still relatively placed to each other in the same position as the martensite phase 204.

Upon application of heat 208 to the shape memory alloy in the deformed martensite phase 206, which results in heating the shape memory alloy to a high temperature, the shape memory alloy inherently returns to its original shape. It should be noted that the imposition of stress 211 on the shape memory alloy in the martensite phase 204 is one-way and causes the deformation of the material (e.g., into the deformed martensite phase 206) that will not go back to its unstressed or pre-stressed form until heat 208 is applied. On the other hand, stress 212 imparted in the austenite phase 210, which as explained in more detail below is a bidirectional phase change in that when the stress 212 is removed, the shape memory alloy returns back to its unstressed form (e.g., original shape) without the addition of heat 208.

In the original shape, the shape memory alloy is in an austenite phase 210, which has a cubic crystal structure. When cooled to a low temperature, the shape memory alloy in the austenite phase 210 transitions back to the martensite phase 204. Unlike other metals, this transition between the phases (austenite phase 210 to martensite phases 204 and 206) is reversible and repeatable. It should be appreciated that a large amount of energy is stored in the deformed martensite phase 206, and this energy used by the shape memory alloy to return to its original shape can also be used to separate the shape memory alloy. Examples of shape memory alloys that exhibit the phases illustrated in FIG. 2 include nickel-titanium alloys (e.g., Nitinol), titanium-nickel alloys, copper-zinc-aluminum alloys, copper aluminum nickel alloys, nickel titanium hafnium alloys, and other shape memory alloys.

Figure 3:
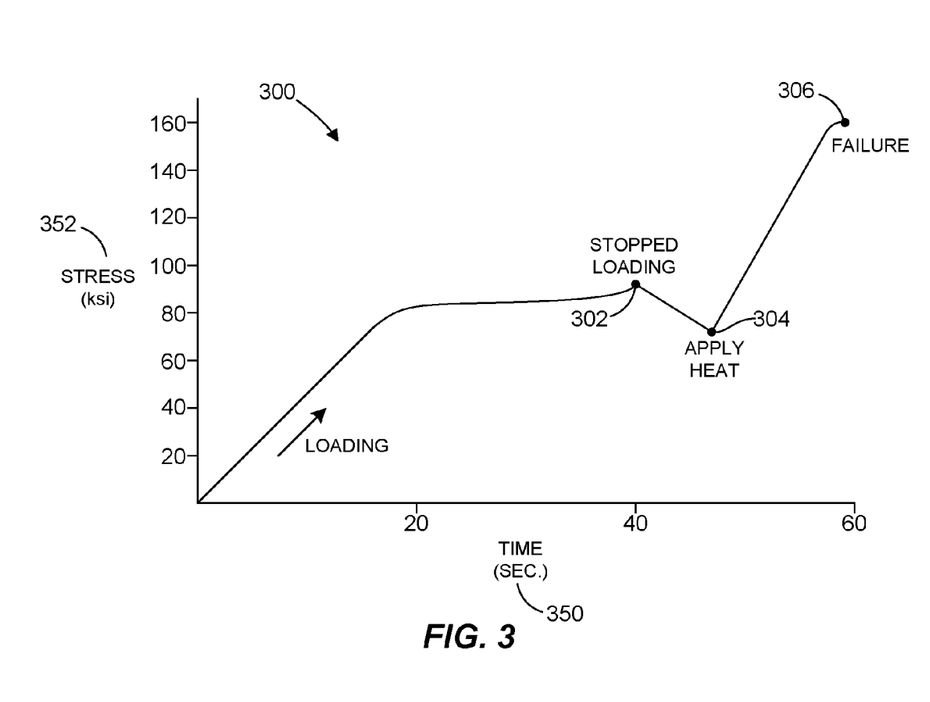
FIG. 3 illustrates a plot of the mechanical behavior of a shape memory alloy with the application of heat, in accordance with an example of the present disclosure.

FIG. 3 illustrates a plot 300 of the mechanical behavior of a shape memory alloy with the application of heat, in accordance with an embodiment of the invention. The plot 300 is a stress versus time curve of a shape memory alloy where the horizontal axis 350 defines time and the vertical axis 352 defines the stress applied to a shape memory alloy.

As depicted in FIG. 3, the shape memory alloy is loaded or stressed (e.g., pulled, compressed, and/or sheared) for a duration of approximately 40 seconds at a constant strain rate at which point 302 the loading is stopped. Thereafter, at point 304, heat is applied to the shape memory alloy and as a result, the shape memory alloy is further stressed because it wants to return to its original shape. With sufficient stress (e.g., at approximately 160 ksi), the shape memory alloy separates or fails at point 306 of the plot 300.

Referring again to FIGS. 1A and 1B, the shape memory member 102 of a mechanical actuator is shown in an unstrained configuration (FIG. 1A) and a strained configuration (FIG. 1B). As shown in FIG. 1A, the shape memory member 102 extends between first and second ends 104, 106. One example of the shape memory member 102 is constructed with a shape memory material including, but not limited to, Nitinol, copper-zinc-aluminum alloys, copper-aluminum-nickel alloys, nickel-titanium-hafnium alloys and other shape memory materials. Further, as previously described, in one example, the shape memory member 102 is provided in an initial martensitic phase. The shape memory material is in the martensitic phase after transition from an austenitic phase. For instance, the material is cooled from the austenitic phase to the martensitic phase as previously described herein. Referring now to FIG. 1B, in the martensitic phase the shape memory member 102 is exposed to one or more stresses to cause strain 107. As shown in FIG. 1B, the stress is provided along a longitudinal axis of the shape memory member 102 (e.g., an axis coincident to the stress). The applied stress transitions the shape memory member 102 into the strained configuration wherein the shape memory member 102 is in a deformed shape and retains the strain after the stress is released and therefore has a longer length than that provided in FIG. 1A. In one aspect, the shape memory member 102 can be strained in tension pseudo-elastically from about 1% to about 12% in the martensite phase relative to the unstrained length of the shape memory member 102 shown in FIG. 1A. In a particular aspect, the shape memory member 102 can be strained in tension pseudo-elastically between about 4% and about 8% in the martensite phase.

As will be described in further detail below, the shape memory member 102 described herein can be utilized in a mechanical actuator to facilitate and/or initiate actuation of the actuator. For example, the shape memory member 102 can facilitate or initiate actuation of the actuator when the member 102 fractures as a result of being exposed to a temperature at or above a specified range of transition temperatures. Upon activation due to reaching the transition temperature or temperature range, the shape memory member 102 transitions from the martensite phase to the austenite phase and contracts from the strained configuration (FIG. 1C) as it attempts to return to its original shape, resulting in a fractured configuration (FIG. 1D) due to the pulling of the shape memory member 102 from the fixed ends 104, 106. Thus, in one aspect, the shape memory member 102 is "self-bifurcating" upon reaching the transition temperature or temperature range. As will be described in further detail below, the shape memory member 102 can be actively operated, for instance with heating elements, foils, films and the like coupled with the member 102 or adjacent to the member 102. In some examples, the shape memory member 102 can be operated according to ambient temperatures, and can thereby be triggered when ambient temperatures rise to or above the specified range of transition temperatures (or a single transition temperature).

The shape memory member 102 described herein can be readily tunable to change phases according to a desired transition temperature (or range of temperatures), such as between about 100 degrees F. and about 325 degrees F. For instance, the selection of shape memory materials, the thermal and/or mechanical conditioning or treatment of the materials, the thickness and width of the member 102 (e.g., its volume), and the stress and/or strain applied to the shape memory member 102 can be coordinated or selected and can be used to determine the transition temperature of the shape memory member 102 (e.g., the temperature that the member 102 will fracture when the first and second ends 104, 106 are fixed in place). In one example, and in contrast to other shape memory alloy devices such as the FRANGIBOLT®, the shape memory member 102 can be strained in tension by about 1% to about 12% and, particularly, by about 4% to about 8%, and then restrained from recovering its original shape. This tensile strain/restraint can raise the activation temperature up to about 325 degrees F. whereas an "as-annealed" shape memory alloy that is only in compression and is allowed to recover its shape can only achieve an activation or transition temperature of about 200 degrees F. Tuning of the shape memory member 102 to transition phases at a specified temperature or range of temperatures can provide reliable and accurate initiation of a mechanical actuator. Stated another way, the shape memory member 102 can be chosen and constructed (e.g., by material selection, size of the member 102, conditioning and the like) to transition from the strained configuration to the fractured configuration and accordingly facilitate and/or initiate actuation of an actuator when exposed to a specified transition temperature (or range of temperatures).

Figure 4A:
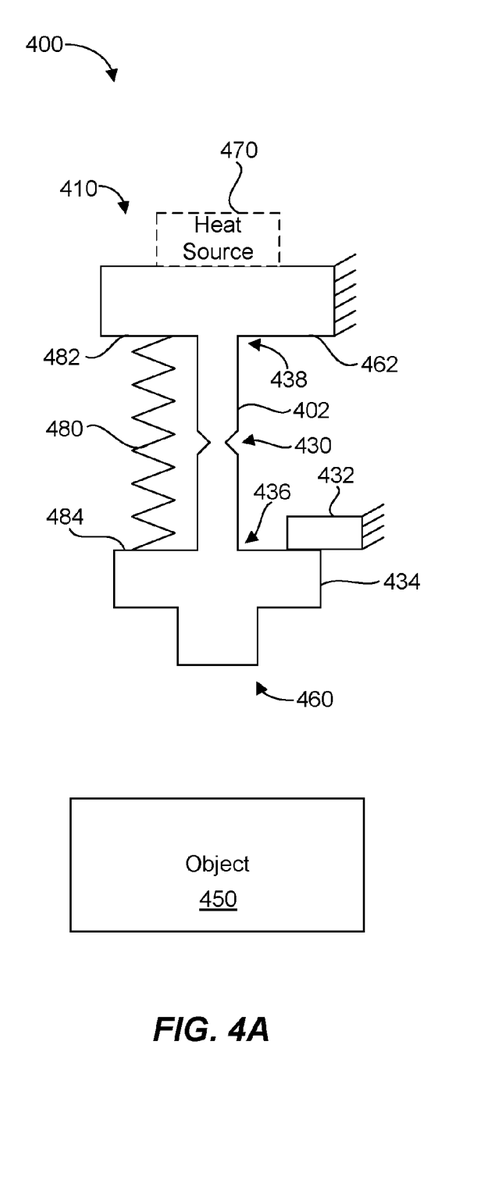
FIG. 4A is a cross-section view of a mechanical actuator with a shape memory member in a strained configuration, in accordance with an example of the present disclosure.
Figure 4B:
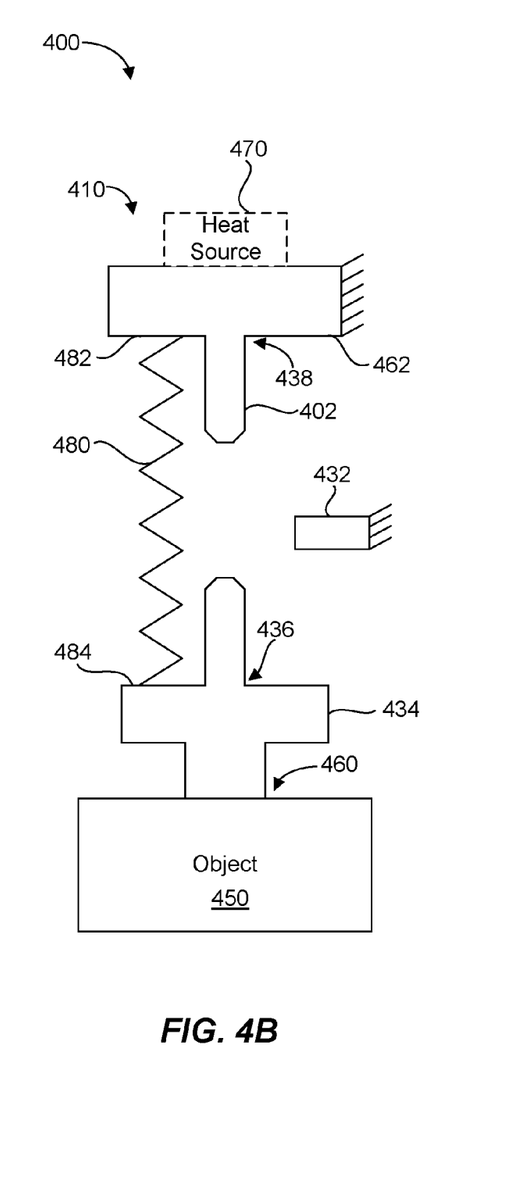
FIG. 4B is a cross-section view of the mechanical actuator of FIG. 4A with the shape memory member in a fractured configuration, in accordance with an example of the present disclosure.

Referring now to FIGS. 4A and 4B, one example of a mechanical actuator system 400 is provided having a mechanical actuator 410, which includes a shape memory member 402 and an object 450 to be acted upon by the mechanical actuator 410. The object 450 can comprise any suitable object that may be acted upon by the mechanical actuator 410, such as a switch, a lever, a button, a primer, a firing cap, a thermal battery, a release mechanism, an initiator, a valve, a tube cutter, or combinations thereof. Accordingly, the mechanical actuator 410 can also include a suitable interface portion 460 configured to interface with the object 450, and the shape memory member 402 can be coupled to the interface portion 460. In some examples, the interface portion 460 can comprise a "pin" that can be pushed and/or pulled to actuate the object 450. In a particular example, the interface portion 460 can comprise a firing pin configured to actuate a primer or a thermal battery.

The shape memory member 402 shown in FIG. 4A is in a strained configuration and is prevented from returning to an original unstrained shape by a support member or anchor 432 providing mechanical interference with a flange 434 coupled to a free end 436 of the shape memory member 402, such that upon reaching a predetermined temperature or temperature range, the shape memory member 402 transitions to the fractured configuration shown in FIG. 4B. The shape memory member 402 can be supported about a base portion 462 proximate a fixed end 438 of the shape memory member 402. The base portion 462 and the support member or anchor 432 can be constrained from moving toward one another, such as by being fixed relative to one another. Thus, as the shape memory member 402 tends to contract or return to its original shape upon reaching the predetermined temperature or temperature range that transitions the material from a deformed martensite structure to an austenite structure, the shape memory member 402 is prevented from contraction by the anchor 432 and the base portion 462 and fractures as result.

As used herein, the "free end" 436 and the "fixed end" 438 of the shape memory member 402 merely refer to the respective ends of the shape memory member 402 that are associated with the interface portion 460 and the base portion 462. Thus, the free end 436 and/or the fixed end 438 may be movable in any suitable degree of freedom. For example, the fixed end 438 may be rotatable relative to the base portion 462 and would therefore not be "fixed" in a strict sense of the word.

In addition, the mechanical actuator 410 can include a heat source 470, which can be used to elevate a temperature of the shape memory member 402 to the predetermined temperature or temperature range. The heat source 470 can be disposed in any suitable location relative to the shape memory member 402, such as in a location to transfer heat to the shape memory member 402 via conduction, convection, and/or radiance. In one aspect, heat from the heat source 470 may be generated by resistance heating, which refers to a process in which heat is generated by passing an electric current through a conductor. For example, a resistance wire, which is an electrical wire with a high electrical resistivity, can be configured to generate heat upon application of an electric current. A resistance wire may be formed from any suitable material, such as a nickel-chromium alloy. A resistance wire can be attached to a surface of the mechanical actuator 410 in any suitable manner, such as using a conductive adhesive. When an electric current is applied to a resistance wire, the electric current can cause the resistance wire to generate heat, which can actuate the mechanical actuator 410. It should be recognized that any suitable technique or device may be used to generate heat. For example, a reactive foil may be used that, in general, comprises layers of metals or other materials (e.g., aluminum layers and/or nickel layers) that, when activated by an electric current, chemically react to deliver localized heat. An example of a reactive foil 804 is NANOFOIL® brand reactive foil (Indium Corporation). In one example, a reactive foil can be attached to or deposited on a surface of the mechanical actuator 410, such as proximate the shape memory member 402 using a conductive adhesive. When an electric current is applied to the reactive foil, the electric current initiates a chemical reaction in the reactive foil that can result in an almost immediate localized heating of the shape memory member 402, which can initiate actuation of the mechanical actuator 410.

Heat can therefore be applied to the shape memory member 402 by operation of the heat source 470 to actively trigger or initiate transition of the shape memory member 402 from the strained configuration shown in FIG. 4A to the fractured configuration shown in FIG. 4B. It should be recognized that in some examples, actuation of the mechanical actuator 410 can be passively initiated. For example, the mechanical actuator 410 may not include a heat source. In this case, the mechanical actuator 410 can be configured to operate according to an ambient temperature, such as where the ambient temperature around the mechanical actuator 410 rises to or above the predetermined transition temperature or range of temperatures to cause the shape memory member 402 to transition from the strained configuration to the fractured configuration. In one example, due to the ability of the shape memory member 402 to passively initiate actuation at a given temperature or range of temperatures, the mechanical actuator 410 can be configured to open a valve to prevent overpressure of a pressure vessel in the event of a fire. In some cases, the shape memory member 402 can be configured to activate or transition based on the auto-ignition temperature of a substance, such as a flammable material.

In one aspect, the shape memory member 402 can comprise a stress concentration feature 430 to provide a fracture locus, configured to specifically locate or position the point of fracture. In one example, the stress concentration feature 430 can include a notch formed in the shape memory member 402 to locally reduce the cross-sectional area of the shape memory member 402, which can be formed by any suitable manufacturing process, such as cutting, molding, coining, etc. In one aspect, the stress concentration feature 430 can be formed after strain has been imparted to the shape memory member 402 and the shape memory member 402 is unstressed. The stress concentration feature 430 can be located in any suitable position about the shape memory member 402. For example, the stress concentration feature 430 can be positioned toward the interface portion 460, which can reduce or minimize the mass that moves with the interface portion 460 once the shape memory member 402 has fractured.

The mechanical actuator 410 can also include a spring 480 configured to exert a force on the interface portion 460. For example, upon fracture of the shape memory member 402 at a predetermined temperature or temperature range, the force of the spring 480 can cause the interface portion 460 to act on the object 450, as shown in FIG. 4B. Thus, the mechanical actuator 410 can be configured to provide a mechanical force to a mechanism or object, such as to actuate a pneumatic or hydraulic valve, a switch, a thermal battery, percussion cap, etc. In one aspect, the mechanical actuator 410 can include a static spring seat 482 associated with the base portion 462 and a dynamic spring seat 484 associated with the interface portion 460. The static and dynamic spring seats 482, 484 can be configured to interface with the spring 480, for example, when the spring 480 is disposed between the static spring seat 482 and the dynamic spring seat 484. In one aspect, the spring 480 can be disposed about an exterior of the shape memory member 402. Prior to fracture of the shape memory member 402, the shape memory member 402 can support the dynamic spring seat 484 relative to the static spring seat 482. Upon fracture of the shape memory member 402, the spring 480 can move the dynamic spring seat 484 relative to the static spring seat 482, causing the interface portion 460 to move with the free end 436 of the shape memory member 402.

The spring 480 can be of any suitable configuration and can be constructed of any suitable material. The spring need not be of a traditional form such as a round wire wound helix, but could be other shapes such as square wire helix, leaf spring, or elastic solid cylinder. In one example, the spring 480 can comprise a compression spring maintained in compression by the shape memory member 402 until fracture or separation of the shape memory member 402. In another example, the spring 480 can comprise a shape memory material or alloy, which can have the same or similar transition temperature as the shape memory member 402. In this case, therefore, the spring 480 can be configured to "activate" and increase in length to exert a force on the interface portion 460 at about the same temperature or temperature range as the shape memory member 402 is configured to fracture. This configuration can reduce or eliminate creep or deformation over time of the shape memory member 402 because the spring 480 can be configured to exert little or no force on the interface portion 460, which is being held in place by the shape memory member 402, prior to activation of the spring 480 and/or the shape memory member 402. For example, a spring 480 constructed of a shape memory material or alloy can be configured to activate above a normal ambient or operating temperature, which will avoid putting the shape memory member 402 in tension prior to activation of the spring 480 and/or the shape memory member 402. By installing the shape memory member 402 in a strained but non-tensioned configuration with no forces acting on the shape memory member 402, the shape memory member 402 will not be subject to gradual creep over time, which can provide reliable and predetermined performance after being stored for large spans of time, such as five or more years.

In one aspect, the spring 480 can facilitate fracture of the shape memory member 402 by being configured to prevent the shape memory member 402 from returning to its original shape. For example, the spring 480 can have a stiffness that substantially resists contraction of the shape memory member 402 to its original shape when heated to the transition temperature. In this case, there is no need for a support member or anchor 432, as the spring 480 thus configured provides the same function.

As discussed herein above, fracture of the shape memory member 402 can release spring energy from the spring 480 to drive or propel the interface portion 460 in a desired direction and/or with a desired force to act on the object 450. In one aspect, the shape memory member 402 can transform stored potential energy from strain and subsequent tensioning of the member 402 into kinetic energy that can also serve to drive or propel the interface portion 460 in a desired direction and/or with a desired force to act on the object 450. In other words, when the shape memory member 402 is fractured, it has a certain amount of "snap-back" or recoil, which can contribute to driving or propelling the interface portion 460. Thus, fracturing of the shape memory member 402 and releasing energy from the spring 480 can drive or propel the interface portion 460 without an explosive reaction, which substantially eliminates or minimizes fragmentation (e.g., little or no FOD is generated).

In one aspect, the stress concentration feature 430 can be located relative to the shape memory member 402 to account for the snap-back of the shape memory member 402 when fractured. For example, by positioning the stress concentration feature 430 proximate to the fixed end 438 and remote from the free end 436 of the shape memory member 402, tensioning of the shape memory member 402 and subsequent fracture can ensure that the kinetic energy generated by the shape memory member 402 is substantially delivered to the interface portion 460. Stated another way, as the shape memory member 402 fractures, tension is released and converted to kinetic energy within the shape memory member 402 according to the volume of the fractured components of the shape memory member 402. By ensuring the majority of the volume of the shape memory member 402 is coupled with the interface portion 460, the corresponding generated kinetic energy is thereby transmitted to the interface portion 460 by the large volume of the shape memory member 402 that remains coupled to the interface portion 460. In other examples, the stress concentration feature 430 can be positioned nearer to the free end 436 to tune the amount of kinetic energy transmitted to the projectile and correspondingly delivered by the interface portion 460 upon contact with the object 450.

Figure 5A:
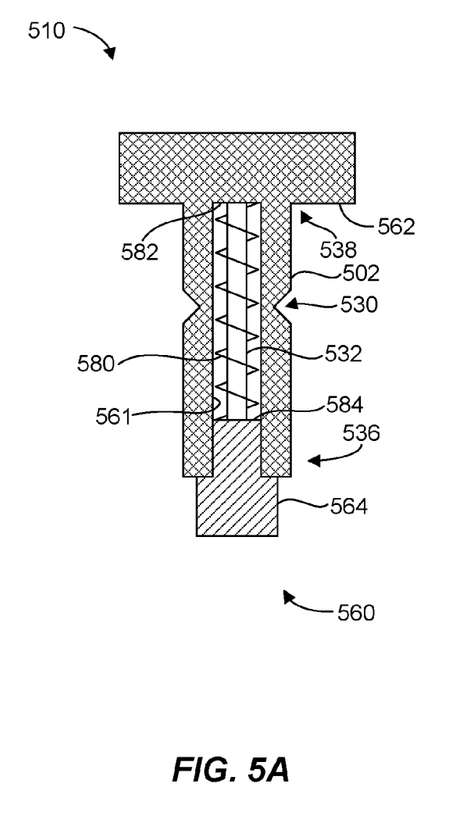
FIG. 5A is a cross-section view of a mechanical actuator with a shape memory member in a strained configuration, in accordance with another example of the present disclosure.
Figure 5B:
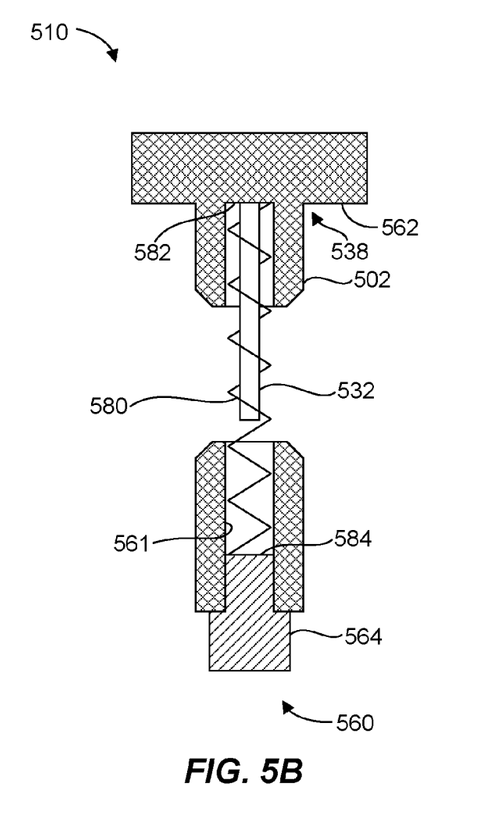
FIG. 5B is a cross-section view of the mechanical actuator of FIG. 5A with the shape memory member in a fractured configuration, in accordance with another example of the present disclosure.

FIGS. 5A and 5B illustrate a mechanical actuator 510, in accordance with another example of the present disclosure. The mechanical actuator 510 is similar in many respects to the mechanical actuator 410 of FIGS. 4A and 4B. For example, the mechanical actuator 510 comprises a shape memory member 502 that includes a stress concentration feature 530 and is supported about a base portion 562 at a fixed end 538. The mechanical actuator 510 further comprises an interface portion 560, a support member 532 to prevent the shape memory member 502 from returning to its original shape, and a spring 580.

In this case, the support member 532 and/or the spring 580 can be disposed at least partially within the shape memory member 502. For example, the shape memory member 502 has an opening 561 configured to receive the support member 532 and/or the spring 580. A cap or plug 564 can include or provide the interface portion 560, which can be coupled to a free end 536 of the shape memory member 502, such as by a threaded interface. The cap or plug 564 can also be configured to provide a dynamic spring seat 584 and an interface for the support member 532. At the fixed end 538 of the shape memory member 502, the base portion can be configured to provide a static spring seat 582 as well as an interface for the support member 532. Thus, as with other examples disclosed herein, the mechanical actuator 510 can be actuated when the shape memory member 502 reaches a predetermined temperature or temperature range and transitions from the strained configuration shown in FIG. 5A to the fractured configuration shown in FIG. 5B.

Figure 6A:
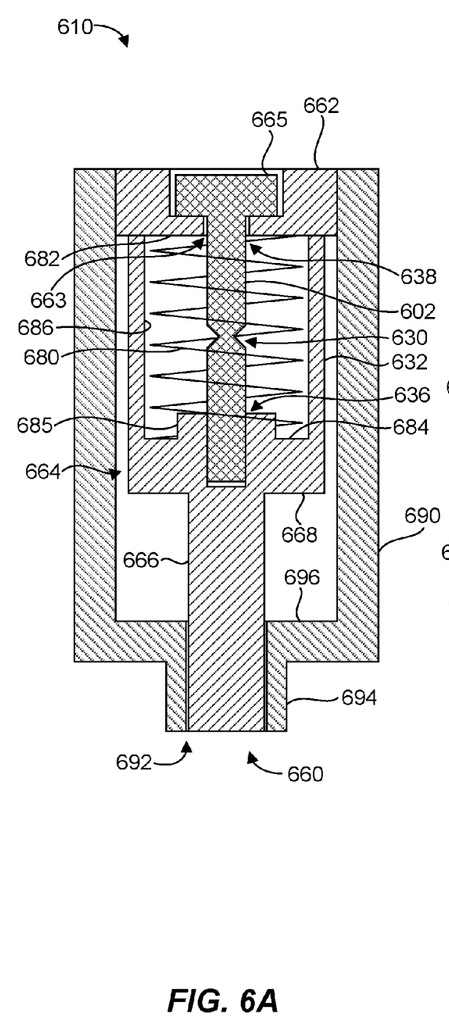
FIG. 6A is a cross-section view of a mechanical actuator with a shape memory member in a strained configuration, in accordance with yet another example of the present disclosure.
Figure 6B:
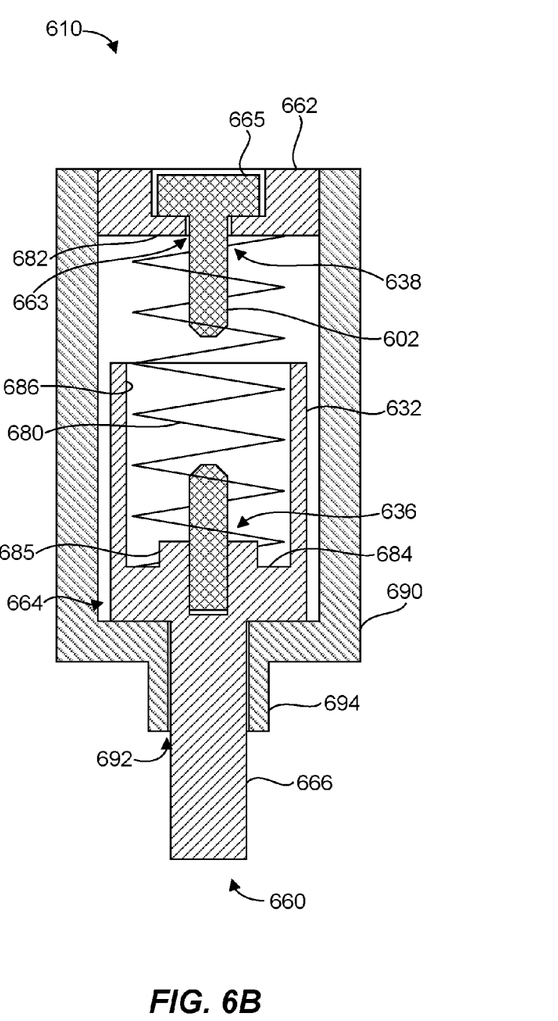
FIG. 6B is a cross-section view of the mechanical actuator of FIG. 6A with the shape memory member in a fractured configuration, in accordance with yet another example of the present disclosure.

FIGS. 6A and 6B illustrate a mechanical actuator 610, in accordance with yet another example of the present disclosure. The mechanical actuator 610 is similar in many respects to the mechanical actuators 410, 510 of FIGS. 4A-5B. For example, the mechanical actuator 610 comprises a shape memory member 602 that includes a stress concentration feature 630 and is supported about a base portion 662 at a fixed end 638. The mechanical actuator 610 further comprises an interface portion 660, a support member 632 to prevent the shape memory member 602 from returning to its original shape, and a spring 680.

In this case, the support member 632 and/or the spring 680 can be configured to at least partially surround the shape memory member 602. For example, the support member 632 is shown in a cylindrical configuration and has an opening 686 configured to receive the shape memory member 602 and/or the spring 680. An end cap 664 for the cylindrical support member 632 can be coupled to the interface portion 660 via a shaft 666, which can be coupled to a free end 636 of the shape memory member 602, such as by a threaded interface. The cap 664 can also be configured to provide a dynamic spring seat 684 and can be coupled to the support member 632 in any suitable manner. A centering feature 685 can be configured to center the spring 680 about the shape memory member 602 and/or within the support member 632 to prevent interference with the spring 680 once the mechanical actuator 610 has been activated.

As shown in the figures, the cap 664, shaft 666, and support member 632 are integrally connected and formed from a single piece of material. It should be recognized, however, that the cap 664, shaft 666, and support member 632 can be individual components coupled in any suitable manner. The support member 632 is typically constructed with robust materials configured to restrain the shape memory member 602 during transition from the strained configuration shown in FIG. 6A to the fractured configuration shown in FIG. 6B. The support member 632 can be constructed with, but not limited to, metals, composites and the like such as steel, aluminum, titanium and other similarly robust materials.

At the fixed end 638 of the shape memory member 602, the base portion 662 can be configured to provide a static spring seat 682 as well as an interface for the support member 632. Thus, as with other examples disclosed herein, the mechanical actuator 610 can be actuated when the shape memory member 602 reaches a predetermined temperature or temperature range and transitions from the strained configuration to the fractured configuration.

In one aspect, the base portion 662 can include an opening 663 to facilitate passage of the shape memory member 602 through the base portion 662. Thus, for example, the shape memory member 602 can have a bolt or threaded rod configuration, such that the shape memory member 602 passes through the opening 663 to engage the cap 664 via a threaded interface, and a head 665 of the shape memory member 602 can facilitate applying torque to the shape memory member 602 to preload the spring 680 and/or bring the support member 632 into contact or close proximity to the base portion 662.

In addition, the mechanical actuator 610 can include an outer housing 690, which can be disposed at least partially about the shape memory member 602, the spring 680, and/or the support member 632. The outer housing 690 can be configured to shield or protect components of the mechanical actuator 610 to ensure operability of the mechanical actuator 610 when actuated. In one aspect, the outer housing 690 can include an opening 692 configured to facilitate movement of the interface portion 660, such that the interface portion 660 can act on an object located external to the outer housing 690. In a particular aspect, the opening 692 can be configured to maintain alignment of the shaft 666 in the opening 692 as the shaft 666 moves through the opening 692 to guide and direct the interface portion 660 and ensure that the interface portion 660 properly engages or interacts with the object. For example, the outer housing 690 can include an opening flange 694 that extends a length of the opening 692 to maintain alignment of the shaft 666 in the opening 692.

The outer housing 690 can also be configured to interface with the cap 664 to provide a mechanical stop or limit to the range of travel of the interface portion 660. For example, the outer housing 690 can have a contact feature 696 located on an interior of the outer housing 690 configured to contact a contact feature 668 of the cap 664. Thus, when actuated, the interface portion 660 can move until the contact feature 668 of the cap 664 contacts the contact feature 696 of the outer housing 690.

In one aspect, where the mechanical actuator 610 is actively triggered, a thermal insulator can be incorporated into the mechanical actuator 610. Thermal insulators substantially isolate the shape memory member 602 from ambient temperatures exterior to the mechanical actuator 610. In one example, the thermal insulation is incorporated into the outer housing 690 of the mechanical actuator 610, such as about an interior and/or exterior of the outer housing 690. In another example, a thermal insulation cap can be provided about an exterior of the base portion 662 to ensure the shape memory member 602 is not otherwise exposed to ambient temperatures exterior to the mechanical actuator 610.

Figure 7A:
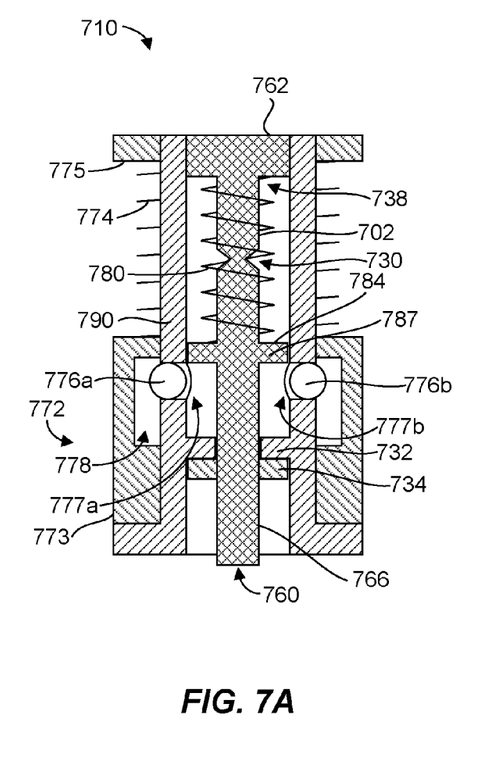
FIG. 7A is a cross-section view of a mechanical actuator with a shape memory member in a strained configuration, in accordance with still another example of the present disclosure.
Figure 7B:
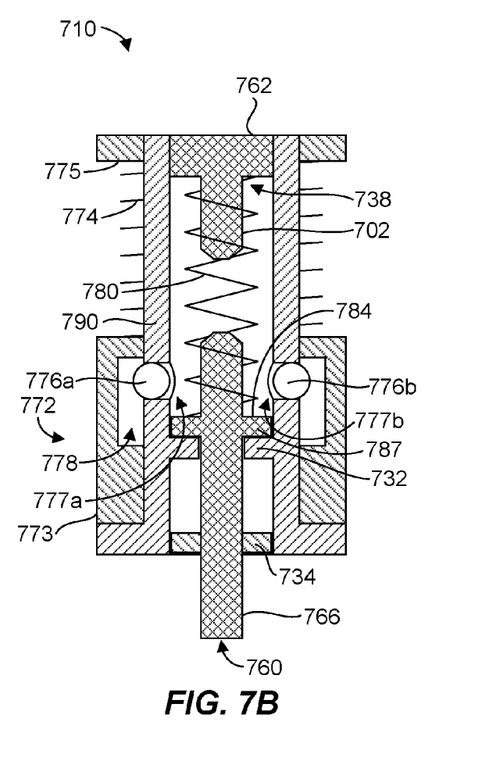
FIG. 7B is a cross-section view of the mechanical actuator of FIG. 7A with the shape memory member in a fractured configuration, in accordance with still another example of the present disclosure.
Figure 7C:
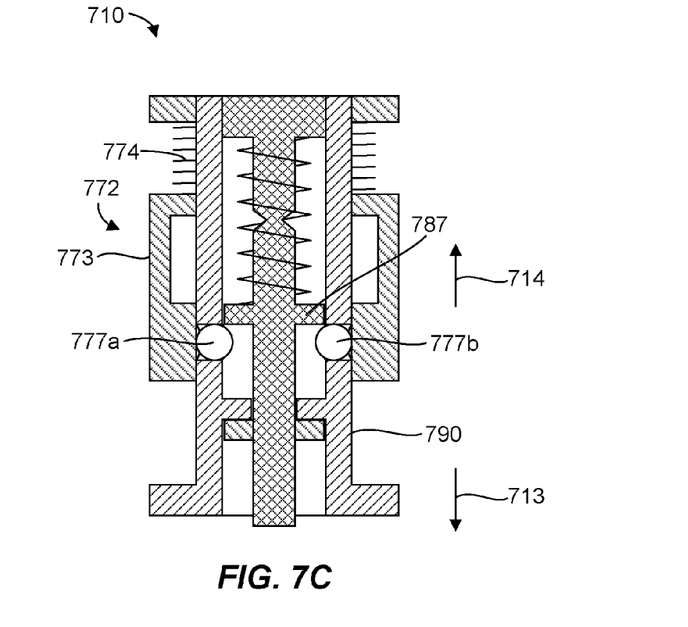
FIG. 7C is a cross-section view of the mechanical actuator of FIG. 7A with a safety lockout mechanism in a locked position, in accordance with an example of the present disclosure.

FIGS. 7A-7C illustrate a mechanical actuator 710, in accordance with still another example of the present disclosure. The mechanical actuator 710 is similar in many respects to the mechanical actuators 410, 510, 610 of FIGS. 4A-6B. For example, the mechanical actuator 710 comprises a shape memory member 702 that includes a stress concentration feature 730 and is supported about a base portion 762 at a fixed end 738. The mechanical actuator 710 further comprises an interface portion 760, a support member 732 to prevent the shape memory member 702 from returning to its original shape, and a spring 780. The support member 732 can provide mechanical interference with a flange 734 associated with a shaft 766 that is coupled to the shape memory member 702. FIG. 7A shows the mechanical actuator 710 with the shape memory member 702 in the strained configuration and FIG. 7B shows the mechanical actuator 710 in the fractured configuration.

In this case, the mechanical actuator 710 also includes a safety lockout mechanism 772 to prevent movement of the interface portion 760. In one aspect, the safety lockout mechanism 772 can prevent actuation or movement of the interface portion 760 even upon fracture of the shape memory member 702. For example, the safety lockout mechanism 772 can include a sleeve 773 disposed about, and slidable relative to, a housing 790 of the mechanical actuator 710. Sliding movement of the sleeve 773 can be resisted by a safety spring 774 disposed about the housing 790 that can interface the sleeve 773 and a safety spring seat 775 supported by the housing 790. The safety lockout mechanism 772 can also include an interference member 776a, 776b (e.g., steel balls) to provide a mechanical interference with a member movable with the interface portion 760 upon fracture of the shape memory member 702, such as a flange 787 that forms a dynamic spring seat 784. The housing 790 can include an opening 777a, 777b configured to facilitate movement of the interference member 776a, 776b within the opening 777a, 777b. In addition, the sleeve 773 can have an opening 778 or recess to receive at least a portion of the interference member 776a, 776b. As shown in FIG. 7A, the interference member 776a, 776b can comprise first and second balls that can move into the opening 778 to facilitate movement of the interface portion 760 upon fracture of the shape memory member 702, such as by providing clearance for the flange 787.2).

In one aspect, the safety lockout mechanism 772 can be locked or activated by inertia of the sleeve 773. For example, as illustrated in FIG. 7C, upon acceleration of the mechanical actuator 710 in direction 713, inertia of the sleeve 773 can cause the sleeve to move in direction 714 relative to the housing 790, which can force the interference member 776a, 776b to move into the housing 790 through the opening 777a, 777b to provide a mechanical interference with a member movable with the interface portion 760 upon fracture of the shape memory member 702, such as the flange 787. The safety spring 774, which compresses in response to movement of the sleeve 773 in direction 714, can be configured to facilitate activation of the safety lockout mechanism 772 when the mechanical actuator 710 is subjected to a predetermined acceleration in direction 713. In one aspect, the sleeve 773 can be maintained in the locked or activated configuration shown in FIG. 7C by a detent or other locking or capture mechanism (not shown).

In accordance with one embodiment of the present invention, a method for facilitating mechanical actuation of an object is disclosed. The method can comprise providing a mechanical actuator having an interface portion configured to interface with an object, a spring configured to exert a force on the interface portion, and a shape memory member coupled to the interface portion. Additionally, the method can comprise facilitating fracture of the shape memory member at a predetermined temperature range, wherein upon fracture of the shape memory member, the force of the spring causes the interface portion to act on the object. It is noted that no specific order is required in this method, though generally in one embodiment, these method steps can be carried out sequentially.

In one aspect, the mechanical actuator can further comprise a heat source to elevate a temperature of the shape memory member to the predetermined temperature range.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A mechanical actuator, comprising:
    an interface portion configured to interface with an object;
    a spring positioned adjacent the interface portion, the spring comprising a shape memory alloy having a pre-determined transition temperature; and
    a shape memory member having one end coupled to the interface portion and having a transition temperature the same or similar to the transition temperature of the spring, wherein the shape memory member comprises a stress concentrator to provide a fracture locus, and
    wherein, upon reaching the transition temperature, the shape memory member fractures and the spring exerts a force on the interface portion to act on the object.

2. The mechanical actuator of claim 1, wherein the spring is present in an uncompressed state until reaching the transition temperature.

3. The mechanical actuator of claim 1, wherein the spring is disposed within the shape memory member.

4. The mechanical actuator of claim 1, wherein the shape memory member is strained between about 1% and about 12% in the martensite phase.

5. The mechanical actuator of claim 1, further comprising a heat source to elevate a temperature of the shape memory member to the transition temperature.

6. The mechanical actuator of claim 1, further comprising a static spring seat and a dynamic spring seat configured to interface with the spring, wherein, prior to fracture, the shape memory member supports the dynamic spring seat relative to the static spring seat, and the spring is disposed between the static spring seat and the dynamic spring seat and configured to move the dynamic spring seat relative to the static spring seat upon fracture of the shape memory member.

7. The mechanical actuator of claim 6, wherein the dynamic spring seat is associated with the interface portion.

8. The mechanical actuator of claim 1, wherein the spring is disposed about an exterior of the shape memory member.

9. The mechanical actuator of claim 1, wherein the spring is disposed at least partially within the shape memory member.

10. The mechanical actuator of claim 1, wherein the shape memory member is in a deformed shape and wherein the application of heat to the shape memory member is configured to return the shape memory member to an original shape of the shape memory member, and wherein the shape memory member is prevented from returning to the original shape.

11. The mechanical actuator of claim 1, further comprising a shape memory member restrainer to facilitate fracture of the shape memory member by preventing the shape memory member from returning to an original shape of the shape memory member.

12. The mechanical actuator of claim 11, wherein the shape memory member restrainer is configured to be disposed at least partially within the shape memory member.

13. The mechanical actuator of claim 11, wherein the shape memory member restrainer is configured to at least partially surround the shape memory member.

14. The mechanical actuator of claim 1, further comprising an outer housing disposed at least partially about the spring and the shape memory member.

15. The mechanical actuator of claim 14, wherein the outer housing comprises an opening configured to facilitate movement of the interface portion to act on the object located external to the outer housing.

16. The mechanical actuator of claim 1, further comprising a safety lockout mechanism to prevent movement of the interface portion upon fracture of the shape memory member, the safety lockout mechanism comprising:
    a sleeve disposed about and slidable relative to a housing of the mechanical actuator;
    a safety spring disposed about the housing to resist movement of the sleeve; and
    first and second balls moveable to provide a mechanical interference to movement of the shape memory member.

17. A mechanical actuator system, comprising:
    an object; and
    a mechanical actuator, having
        an interface portion configured to interface with the object,
        a spring positioned adjacent the interface portion, the spring comprising a shape memory alloy having a pre-determined transition temperature; and
        a shape memory member having one end coupled to the interface portion and having a transition temperature the same or similar to the transition temperature of the spring, wherein the shape memory member comprises a stress concentrator to provide a fracture locus, and wherein upon reaching the transition temperature, the shape memory member fractures and the spring exerts a force on the interface portion to act on the object.

18. A method for facilitating mechanical actuation of an object, comprising:

providing a mechanical actuator having
- an interface portion configured to interface with an object,
- a spring positioned adjacent the interface portion, the spring comprising a shape memory alloy having a pre-determined transition temperature, and
- a shape memory member coupled to the interface portion and having a transition temperature the same or similar to the transition temperature of the spring; and facilitating fracture of the shape memory member and activation of the spring at the transition temperature, wherein upon fracture of the shape memory member, the force of the spring causes the interface portion to act on the object.

19. The method of claim 18, wherein the mechanical actuator further comprises a heat source to elevate a temperature of the shape memory member to a predetermined temperature-range.

\* \* \* \* \*